United States Patent Office 3,534,504
Patented Oct. 20, 1970

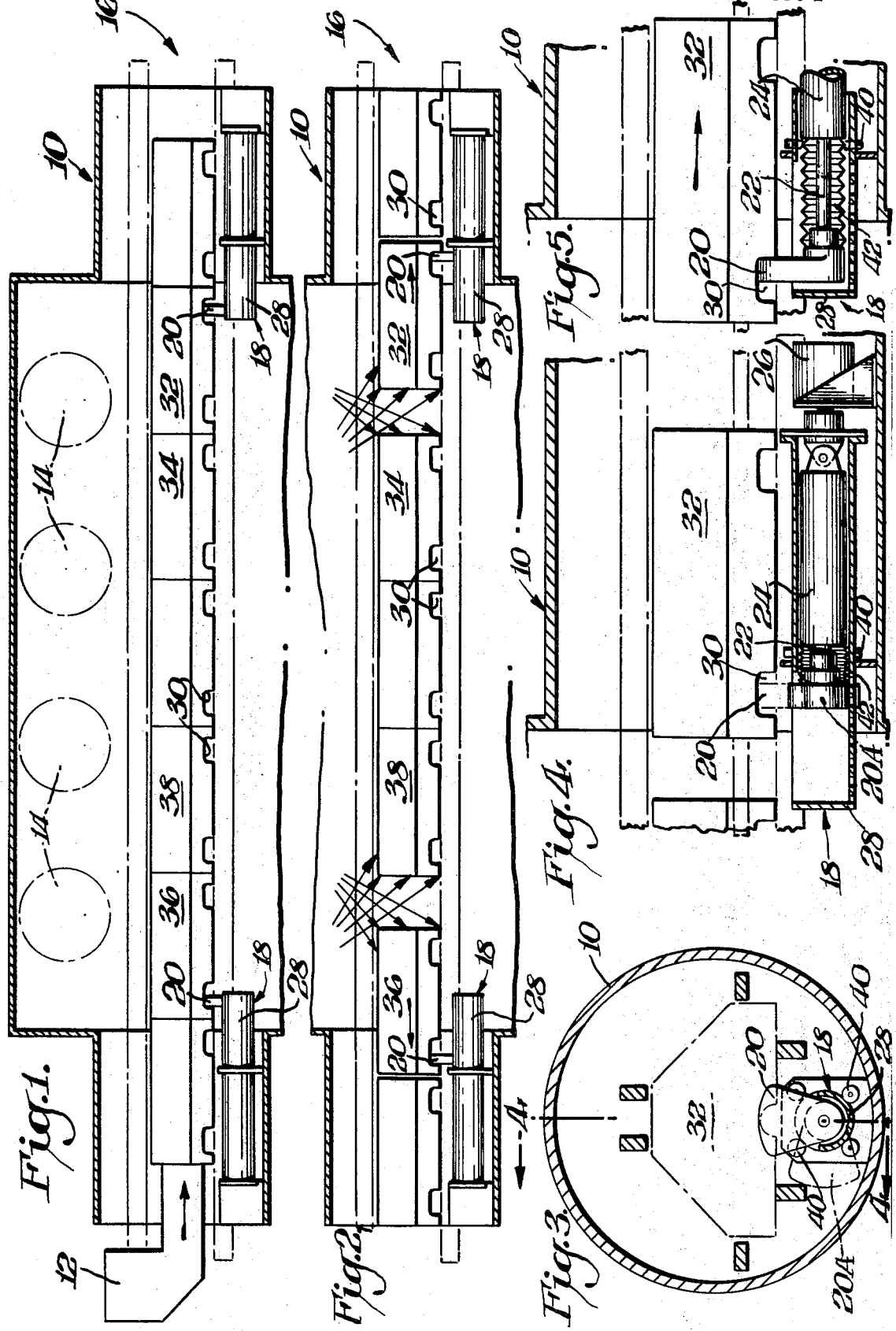

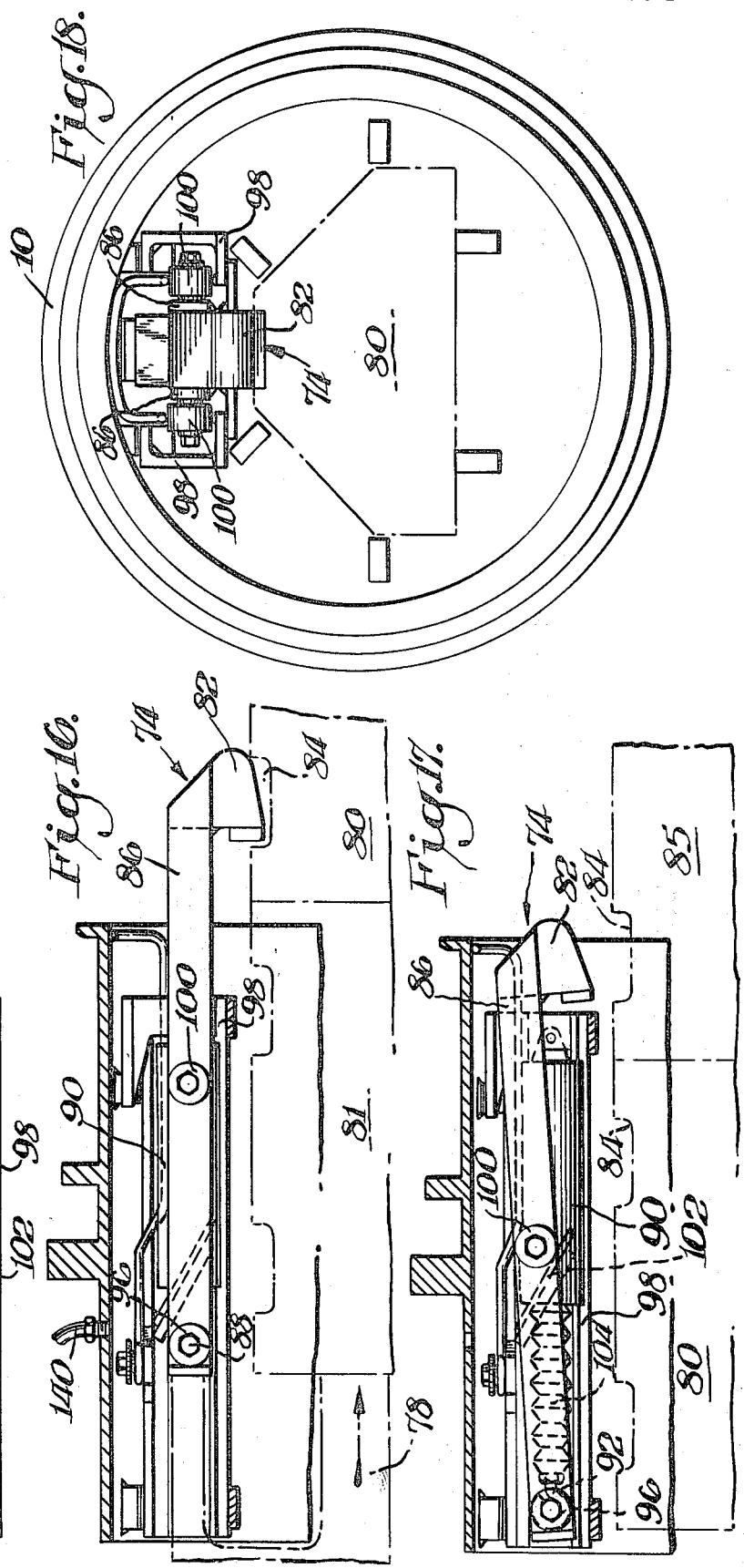

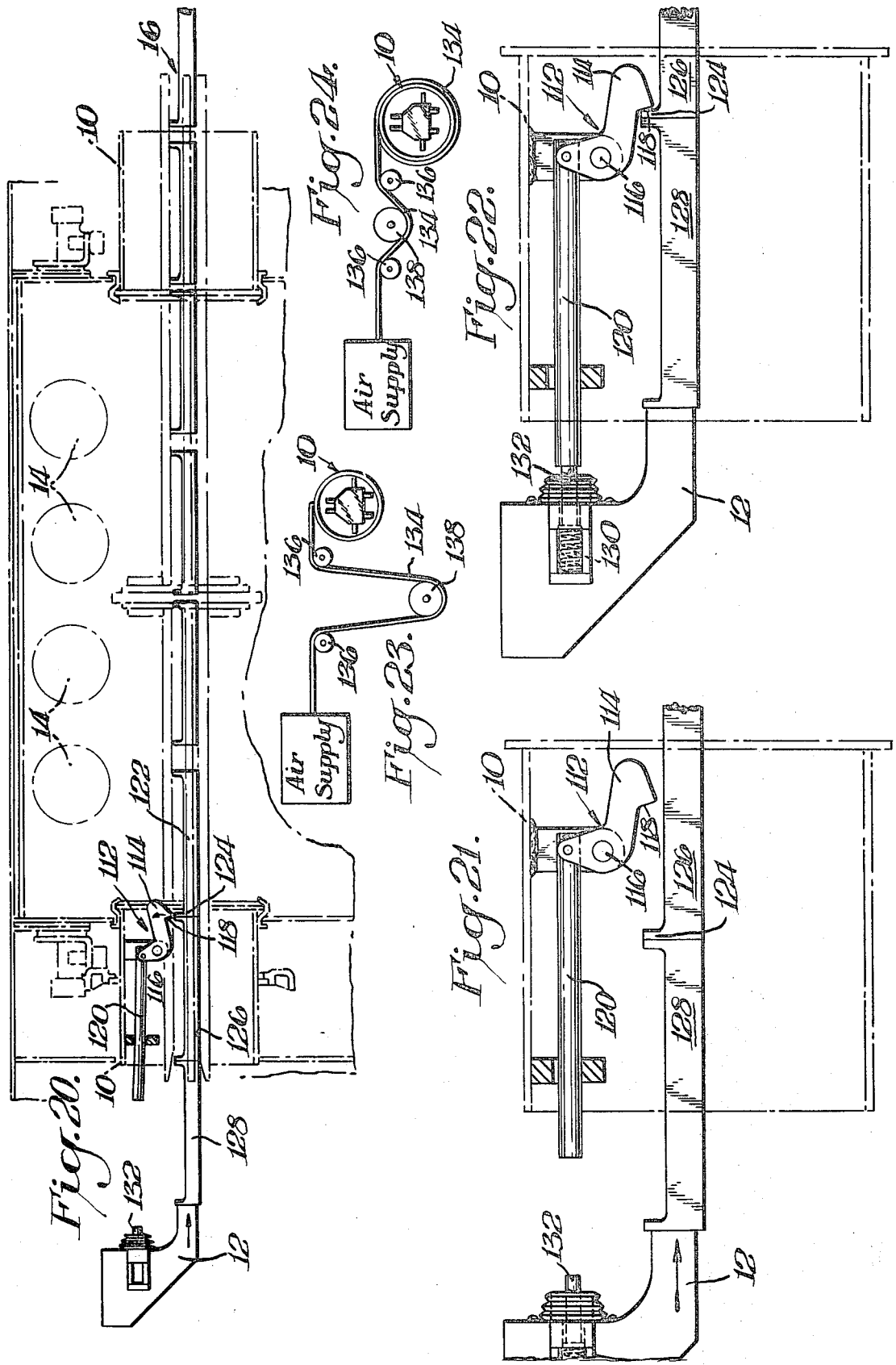

3,534,504
PARTS TREATING APPARATUS
James H. Carpenter, Jr., Hagerstown, Md., assignor to The Carborundum Company, Niagara Falls, N.Y., a corporation of Delaware
Filed Apr. 23, 1968, Ser. No. 723,378
Int. Cl. B24c 3/14
U.S. Cl. 51—15                             13 Claims

ABSTRACT OF THE DISCLOSURE

A parts treating apparatus includes a barrel open at both ends to permit the axial flow of parts therethrough. The barrel rotates to expose different portions of the parts to a treating media as the parts move through the barrel. The apparatus also includes a separating device to move one of the parts away from its adjacent part whereby a gap is created between the ends of the adjacent parts to permit treatment of the ends.

BACKGROUND OF INVENTION

This invention relates to the treatment of parts flowing axially through a barrel. The preferred treatment is by means of abrasive blasting although other suitable treatments such as spraying may also be used. An early attempt at such an apparatus is described in U.S. Pat. 2,204,636. The apparatus of this patent, however, has not provided sufficient control of the parts flowing through its U-shaped trough. Recently there has been developed an effective arrangement which provides the required parts control and is one of the most significant developments in high-production blasting. This development is described in copending application Ser. No. 553,183, filed May 26, 1966. The apparatus of this recent development is particularly effective on parts whose ends are such that a small space between parts allows sufficient abrasive to enter and clean the ends. Such parts which are effectively cleaned are automobile heads, manifolds, etc. One of the significant advantages of the arrangement particularly in the automotive industry is that the improved cleaning can be attained with fewer blasting wheels and less horsepower. For example in most cases the axial flow of parts eliminates the need for a second machine to spot blast parts not cleaned by the first blast. Additionally, such axial flow machines are easily automated thus eliminating expensive labor.

In view of the success in the automotive industry with the above indicated axial flow machine a need has arisen for such a machine which can effectively clean parts such as automobile motor blocks. The above indicated axial flow machine is not as effective as might be desired for cleaning such parts in that the ends of the blocks and similarly shaped parts are relatively inaccessible to the blast stream. In this regard as the parts are pushed into the axial flow barrel the ends are closely mated thus leaving minimal space for the blast media to enter and clean the parts.

SUMMARY OF INVENTION

An object of this invention is to provide a separating device particularly adapted for use with the above indicated axial flow barrel.

In accordance with this invention an axial flow barrel arrangement of the above type includes such a separating device which moves one of the parts away from its adjacent part whereby the treating media or blast stream may enter the gap created between the parts to effectively treat the ends thereof.

The separating device may effectively include a latch which engages one of the parts so that upon actuation by the parts feed ram, the latch effects a relative movement between adjacent parts to thereby create the gap.

In accordance with one aspect of this invention the latch is secured to a piston rod cylinder assembly which in turn is rotated by a rotary actuator. Thus the latch may be rotated into and out of engagement with a part and upon actuation of the piston rod and cylinder assembly the latch may cause axial movement of its engaged part.

In accordance with another aspect of this invention the latch is again secured to a piston rod cylinder assembly and is movable into and out of engagement with the part by a cam. The separation is effected by actuation of the piston rod cylinder assembly when the feed ram contacts a limit switch.

In a still further form of this invention the feed ram itself contacts the piston rod cylinder assembly to move the assembly for engaging the latch with a part with the aid of an appropriately located cam.

In accordance with a still further aspect of this invention the latch is freely pivotable with one end being secured to a rod. The latch is locked in a parts engaging position when the feed ram contacts the rod to inactivate the pivotable movement of the latch so that its engaged part is prevented from further movement. In accordance with this aspect of the invention the gap is created by the natural drift of the preceding part away from the engaged part.

In accordance with another aspect of this invention the power lines for the various assemblies are secured to a retractable device which takes up the slack of the power lines during rotation of the axial flow barrel. In this manner the power lines can wrap and unwrap itself around the barrel during the clockwise and counterclockwise rotation thereof.

In accordance with a still further aspect of this invention the piston rod cylinder assemblies may be provided with bellows boots to effectively seal the assembly from the abrasive and other treating media during the extension and retraction of the piston rod from the cylinder.

THE DRAWINGS

FIG. 1 is a sectional view in elevation of a treating apparatus in accordance with one aspect of this invention;

FIG. 2 is a sectional view similar to FIG. 1 in a different phase of operation;

FIG. 3 is an end view of the apparatus shown in FIGS. 1–2;

FIG. 4 is a sectional view of a portion of the apparatus shown in FIGS. 1–2 taken through FIG. 3 along line 4—4;

FIG. 5 is a sectional view in elevation similar to FIG. 4 in a different phase of operation;

FIG. 15 is a plan view of the separating device shown in FIGS. 10–14;

FIG. 16 is an elevational view in section of the separating device of FIG. 15 is one phase of operation;

FIG. 17 is a view similar to FIG. 16 in a different phase of operation;

FIG. 18 is an end view of the axial flow barrel and separating device of FIGS. 15–17;

FIG. 19 is a sectional view of a portion of the separating device shown in FIGS. 16–18;

FIG. 20 is a schematic view in elevation of a still further embodiment of this invention;

FIGS. 21–22 are elevation views showing the separating device of FIG. 20 in different phases of operation; and FIGS. 23–24 are schematic end views of a further aspect of this invention in different phases of operation.

DETAILED DESCRIPTION

Figure 6:
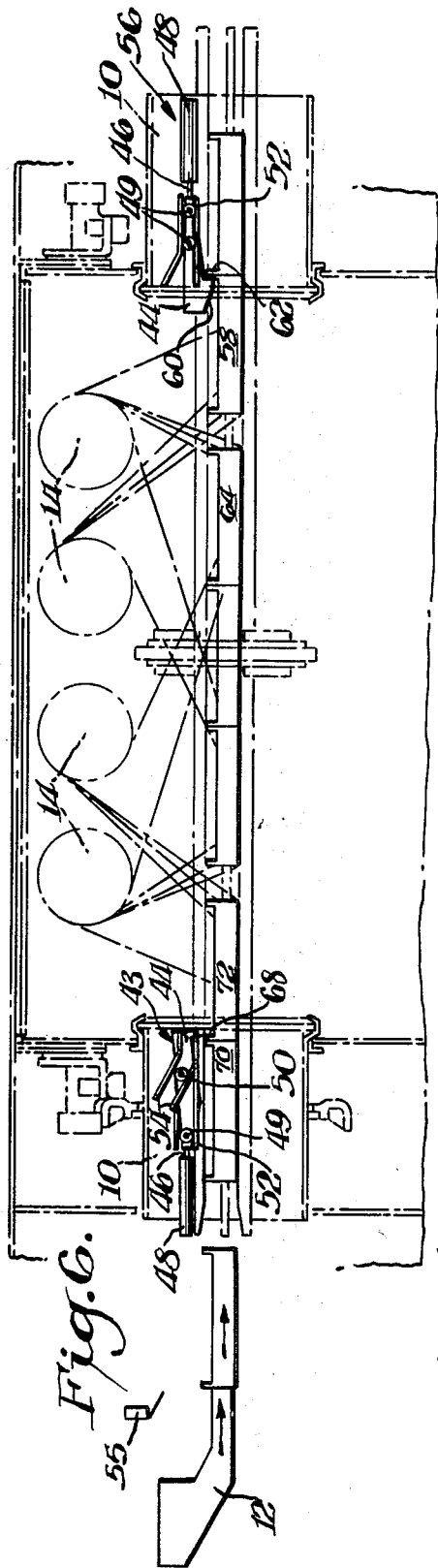
FIG. 6 is a schematic view in elevation of a further embodiment of this invention in one phase of operation.

FIG. 1 shows an axial flow arrangement similar to that described in copending application Ser. No. 553,183, filed May 26, 1966; Ser. No. 592,799, filed Nov. 8, 1966; and Ser. No. 595,426, filed Nov. 18, 1966, now Pat. No. 3,387,410, dated June 11, 1968, the subject matters of which are incorporated herein by reference thereto. As indicated in FIG. 1 the arrangement generally includes an axial barrel 10 which is rotated by a power source (not shown). Parts are ultimately fed into the barrel one at a time by feed ram 12 so that the parts flow axially through the barrel and are cleaned by for example appropriately located abrasive blast wheels 14. The treated parts are discharged through open end 16 of the barrel for further processing. This general arrangement is utilized throughout the various embodiments of this invention described hereafter.

In the embodiment of the invention shown in FIGS. 1–5, the parts to be treated include for example flanges or openings on the lower surfaces as viewed in FIGS. 1 and 2. The separating devices 18 include latches 20 in the form of dogs which engage in these openings to cause the parts separation as later described. As the parts are rammed forward the dog is in a horizontal position as indicated by reference numeral 20a in FIGS. 3 and 4. Dog 20a is secured to the end of a piston rod 22 which is extended from and retracted into cylinder 24. The entire piston rod cylinder assembly 22, 24 is secured to rotary actuator 26 with the entire piston rod cylinder assembly 22, 24 and dog being maintained in housing tube 28. Tube 28 is slotted or otherwise open to permit the dog to protrude therefrom.

When the stroke of ram 12 is completed dog 20 is rotated to the position indicated in FIGS. 3 and 5 and engages in opening 30 of part 32. Piston rod 22 is then retracted to cause part 32 to move in its normal direction of movement as indicated in FIG. 2 away from part 34 whereby a gap is created with respect to adjacent part 34. Similarly, a separating device 18 is also provided at the entrance end of barrel 10 and the part 36 is moved opposite its normal direction of movement away from its adjacent part 38. In this manner the ends of parts 36 and 38 can be given a first or rough cleaning treatment near the entrance of barrel 10 and when the parts are ultimately in the positions indicated by parts 34 and 32, respectively, the cleaning treatment on the ends of these parts can be completed.

When the parts or blocks 32, 36 are pulled away from its adjacent parts 34 and 38, the dog is again rotated by rotary actuator 26 to the position indicated in FIG. 4 so that the cycle may be repeated for the next part. Both the entrance and exit separating devices operate simultaneously.

As soon as the stroke of ram 12 is completed barrel 10 is rotated. The separating motion takes place during the barrel rotation. In order to feed air or hydraulic fluid to the cylinder 24 and the rotary actuator, barrel 10 is alternately rotated clockwise and counterclockwise and the power lines are arranged in an advantageous manner as shown in FIGS. 23 and 24.

Since the separation device 18 is exposed to blast, cylinder 24 is advantageously shielded in housing 28. When the unit is rotated by rotary actuator 26 the tube and cylinder rotate on rollers 40 (FIG. 3). Advantageously a bellows rubber boot 42 effectively protects the piston rod and cylinder assembly during the extension of piston rod 22 from cylinder 24.

FIGS. 6–9 show a further embodiment of this invention. This embodiment includes a latch 44 secured to the end of a piston rod 46 and cylinder 48 assembly. The latch 44 further includes guide rollers 49, 50. Roller 49 rides on rail 52 while roller 50 rides on cam track 54 and also on rail 52. The arrangement is actuated by a limit switch 55 which is contacted by ram 12. An exit separating device 56 is also provided and includes a latch 44, piston rod 46, cylinder 48, rollers 49 and rail 52 similar to the separating device 43 at the entrance end of barrel 10. The difference between separating devices 43 and 56 is that the latch 44 of device 56 is lowered and held down by its own weight or a spring rather than by the cam action.

Figure 7:
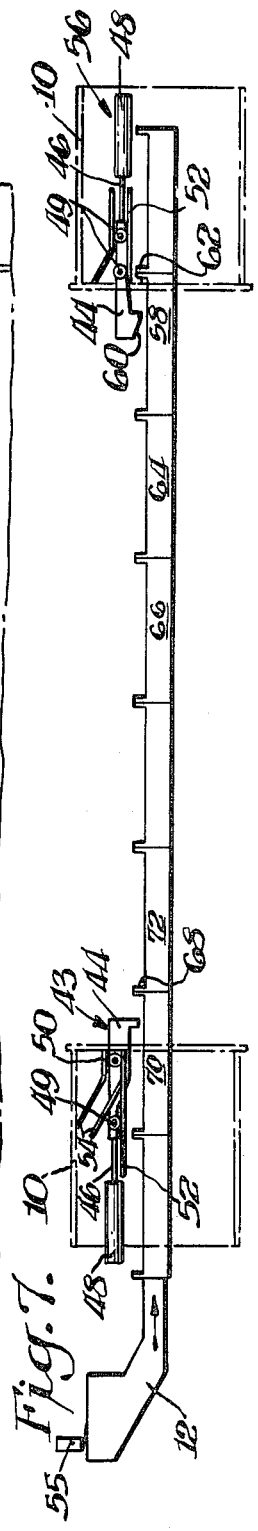
FIGS. 7–8 are schematic views similar to FIG. 6 in different phases of operation.
Figure 8:
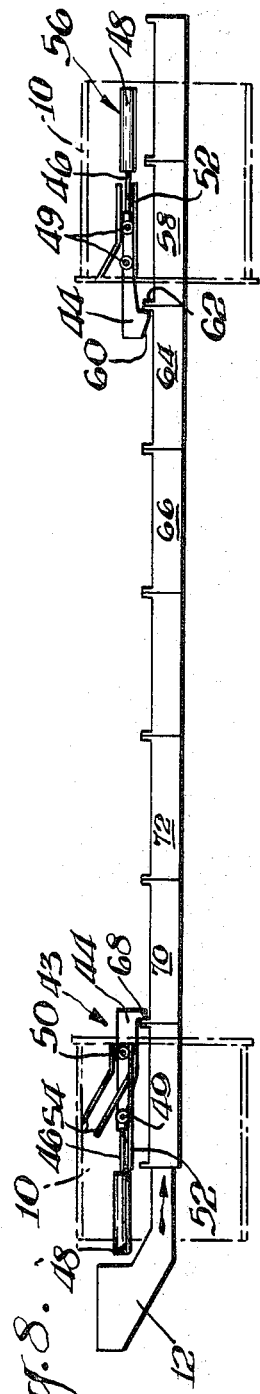
Figure 9:
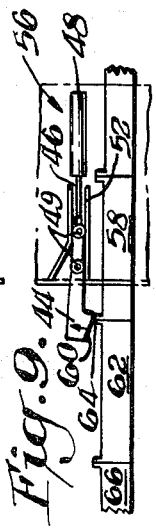
FIG. 9 is a schematic view of a portion of the apparatus shown in FIGS. 6–8 in a still further phase of operation.

In the arrangement shown in FIGS. 6–8 with respect to separating device 43, FIG. 6 indicates the position of the parts to be treated after separation and at the time the ram stroke begins. Latch 44 is raised by cam 54 when piston rod 46 is retracted. As the ram stroke progresses to the position indicated in FIG. 7 limit switch 55 is contacted by ram 12 to actuate both separating devices 43 and 56. Latch 44 of device 56 is eventually raised by part 58 contacting the inclined face 60 of the latch. As indicated in FIG. 9 after part 58 and projection 62 on subsequent part 64 have passed under latch 44, latch 44 falls back into lowered position ready to engage ledge 62 to effect the separation of parts 64 and 66.

At the entrance end with respect to separating device 43, piston rod 46 is extended from cylinder 48 when the ram stroke is approximately one-half complete. As indicated above, this movement is actuated by the contacting of limit switch 55. The extending of piston rod 46 lowers latch 44 since roller 50 rides down cam track 54 onto guide rail 52. In this position (FIG. 7) latch 44 is ready to engage projection 68 on part 70 as indicated in FIG. 8.

When the ram stroke is complete (FIG. 8) both piston rods 46 are simultaneously retracted to cause gaps to be created between adjacent parts 64 and 66 and adjacent parts 70 and 72.

The air or hydraulic or other power line for each cylinder 48 also is arranged in the manner shown in FIGS. 23–24 as later described.

Figure 10:
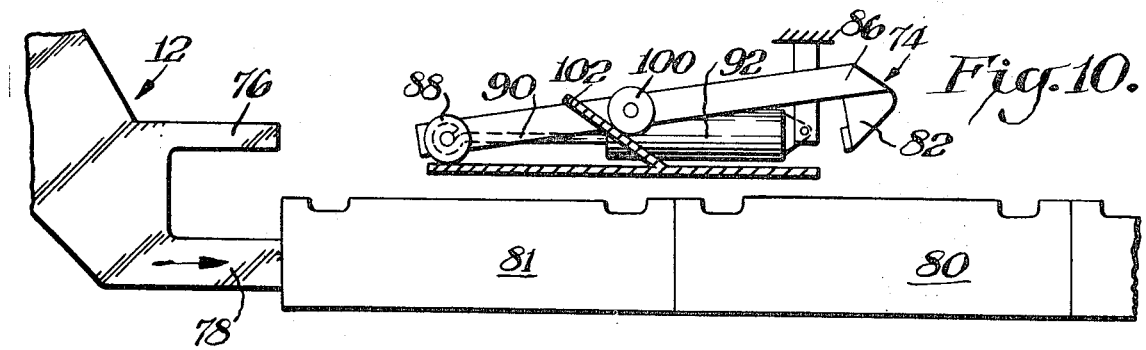
FIGS. 10–14 are schematic views of a further embodiment of this invention showing the sequence of operation.

FIGS. 10–19 relate to a still further embodiment of this invention and which is a variation of the embodiment shown in FIGS. 6–9. The mode of operation with respect to the entrance separating device 74 is schematically illustrated in FIGS. 10–14. The operation of the device 74 is as follows:

Ram 12 includes a projection 76 as well as its ramming surface 78. FIG. 10 shows the ram in an early stage of operation when part 80 is being pushed into barrel 10. At this stage of operation projection 76 is spaced from separating device 74.

Figure 11:
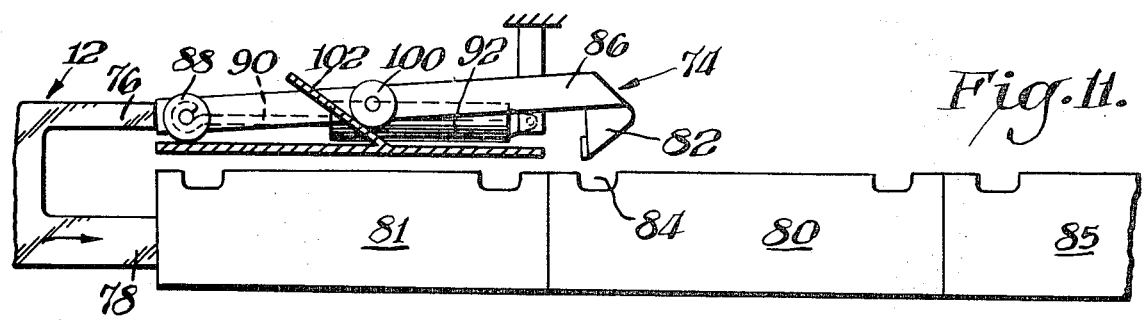

As indicated in FIG. 11 projection 76 contacts separating device 74 when latch 82 is above opening 84 in part 80.

Figure 12:
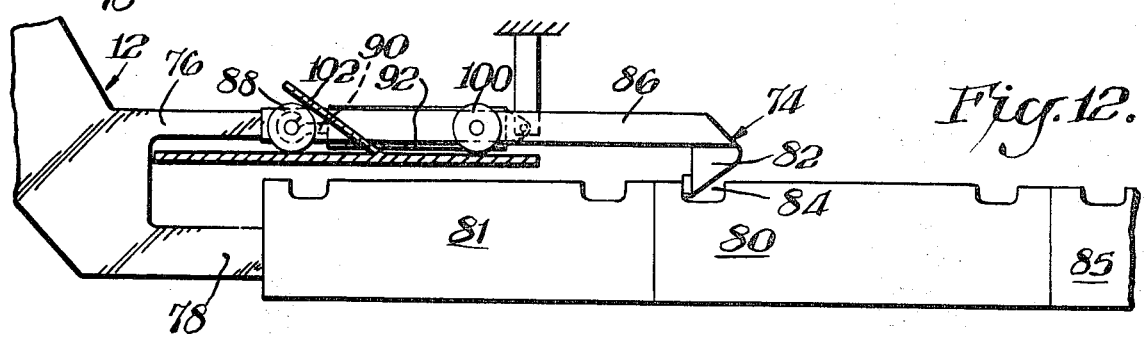
Figure 13:
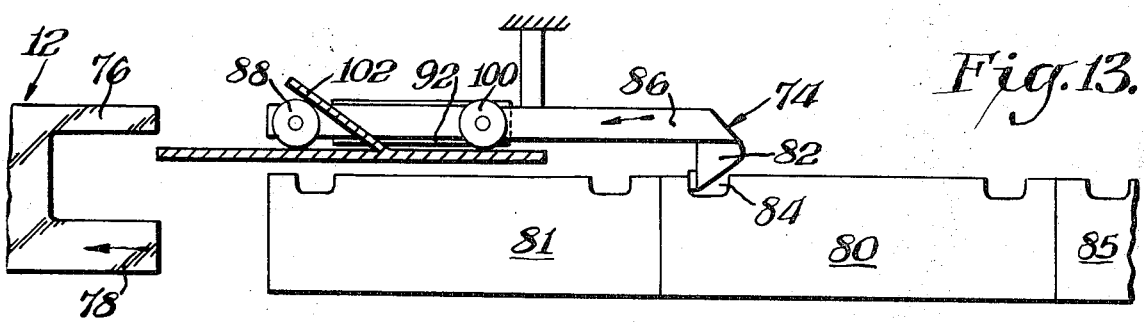

FIG. 12 indicates the next sequence of operations when both separating device 74 and part 80 are moved together at the same speed by ram 12 to thereby maintain latch 82 in the proper position with respect to opening 84. As further indicated in FIG. 12 latch 82 is actuated into its engaging position.

Figure 14:
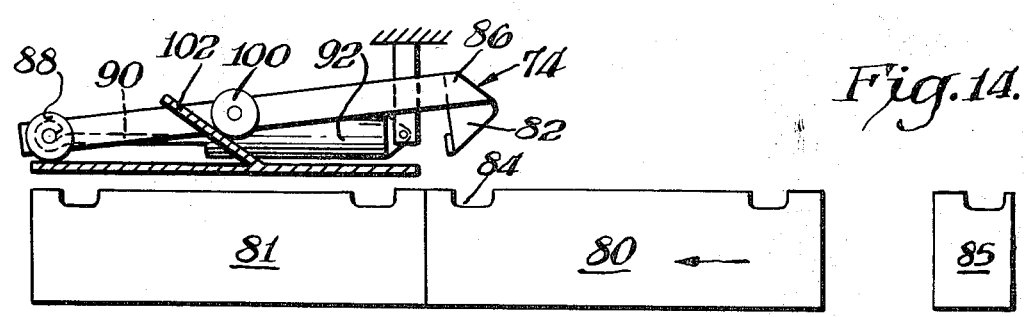

In the next sequence of its operation ram 12 is returned to its starting position and latch 82 remains engaged with part 80. Separating device 74 is then moved in the reverse direction as later described to create a gap between adjacent parts 85, 80, and the separating device is later returned to its starting position as indicated in FIG. 14.

The details of separating device 74 are more clearly shown in FIGS. 17–18. Separating device 74 includes a latch 82 or pawl which is mounted at the open end of a U-shaped frame or carriage 86. Frame 86 is in turn pivotally connected at 88 to the end of piston rod 90 extending from cylinder 92 secured to barrel 10. Carriage or bar 86 includes front rollers 96 riding on rails 98 and also includes rear rollers 100 riding on cam track 102 and rails 98 in accordance with the particular position of rollers 100. A bellows boot 104 (FIG. 17) permits the sealed extension of piston rod 90 from cylinder 92.

FIG. 17 shows separating device 74 in a position comparable to that of FIG. 10 wherein extension 76 of ram 12 has not yet contacted separating device 74. At about seven inches before the ram stroke is completed extension device 76 contacts carriage 86 to cause the carriage to move forward and retract piston rod 90. During this forward movement latch 82 is lowered when its roller 100 rides down rail 102 as indicated in FIG. 16. During this last seven inches of ram stroke, block 80 and its subsequent block 81 move along with latch bar 86 since both the blocks and latch bar are being pushed by the same ram 12. As indicated above during this forward movement latch 82 is lowered by cam 102 behind a suitable ledge or into a hole 84 prior to the separation stroke. When the ram 12 is returned to its loading position separator cylinder 92 causes piston rod 90 to extend to thereby separate the blocks 80 and 85 (FIG. 14). During this reverse movement latch 82 is eventually raised from its engaging position by roller 100 riding up cam 102.

Cylinder 92 is provided with a constant pressure and air supply port 106 (FIG. 15). A relief valve 108 in line 110 leading from the constant pressure and air source prevents a pressure build up. When the ram 12 retracts this constant pressure causes the separating cylinder to extend its piston rod 90 and thereby effectuate separation. A further separating device may be provided at the exit end of barrel 10 similar to that shown in FIGS. 6–9 and the separation may be effected simultaneously with separating device 74 by the provision of appropriately located switches.

The arrangement shown in FIGS. 10–19 is particularly effective for synchronizing the movement of the blocks or parts with the separator to assure the accurate location of the latch with respect to its engaged projection, ledge or opening in the part. Accordingly, with this arrangement an accurate latching may be easily accomplished in a comparatively small opening.

If desired extension 76 may be made adjustable to synchronize the time of contact with the separating device 74 to assure an accurate engagement of the latch 82 with the part where necessitated with different shaped parts.

It has been found that with the various arrangements described herein, a spacing of about 5 or 6 inches at both the discharge end and entrance end is sufficient to clean the ends of an automobile motor block. Where desired, however, only one device at the entrance or exit may be sufficient for the end cleaning of parts.

FIGS. 20–22 show a still further embodiment of this invention. In this embodiment the separation is effected at one end only such as the entrance end and the separation utilizes the natural drift of the parts as they are pushed.

As particularly illustrated in FIGS. 21–22 separating device 112 includes a latch 114 pivotally connected at 116 to barrel 10. On one side of pivot point 116 latch 114 includes parts engaging shoulder 118 while the other side of latch 114 is connected to bar or rod 120.

As ram 12 begins its stroke (FIG. 20) latch 114 freely pivots about pivot point 116 and the part 122 lifts latch 114 and passes thereunder. When the ram 12 finishes its stroke (FIG. 22) ram 12 contacts the end of rod 120 to prevent the pivotal movement of latch 114 whereby shoulder 118 locks against ledge 124 of part 126. The locked latch thus prevents the drift of parts 126 and 128 which are disposed between latch 114 and ram 12. The remaining parts including part 122 continue to drift creating a gap between parts 122 and 126. Other gaps of varying distances develop along the line as shown in FIG. 20 which illustrates the end result of a previous sequence of operation. The amount of gap between parts 122 and 126 is dependent upon the ram speed and friction of the parts in barrel 10.

As shown in FIG. 22 spring 130 in ram 12 acts as a shock absorber for the ram plunger 132 to cushion the stopping of parts 126 and 128.

FIGS. 23–24 illustrate an advantageous arrangement for the power line 134 of the various piston rod cylinder assemblies described above. This power line may convey any suitable means of power such as air and hydraulics. As indicated therein the power line 134 rides over stationary rollers 136 with a movable weight 138 acting directly upon power line 134 between rollers 136. Power line 134 is tangential with barrel 10 and enters the barrel at a suitable point such as point 140 illustrated in FIG. 16.

Barrel 10 as indicated above is alternately rotated clockwise and counterclockwise. This rotation may be of any desired magnitude such as 360°. FIG. 23 indicates the the position of power line 134 at the beginning of a revolution of barrel 10. As indicated therein weight 138 is in its lowermost position to take up the slack in power line 134. During rotation of barrel 10, power line 134 wraps around the barrel and is eventually in the position indicated in FIG. 24 with the weight 138 in its uppermost position still taking up the slack in the power line. When the direction of rotation of barrel 10 is reversed power line 134 is unwrapped and again assumes the position indicated in FIG. 23.

Although the arrangement illustrated in FIGS. 23–24 is particularly effective for permitting power lines to enter the rotating barrel other suitable retractable arrangements such as a spring loaded reel may also be used.

What is claimed is:

1. A parts treating apparatus comprising a barrel, said barrel being open at both ends to permit the axial flow of parts therethrough, treating means adjacent said barrel for applying treating media against the parts flowing through said barrel, means for rotating said barrel for exposing different portions of the parts to the treating media, feed means to supply parts one at a time into said barrel, and separating means for moving one of the parts away from its adjacent part to create a gap between the ends of the adjacent parts whereby the treating media may enter the gap to treat the ends of the adjacent parts.

2. An apparatus as set forth in claim 1 wherein said feed means includes a ram, and control means actuated by said ram to control the operation of said separating means.

3. An apparatus as set forth in claim 1 wherein one of said separating means is provided at each end of said barrel.

4. An apparatus as set forth in claim 1 wherein said separating means includes a latch, lock moving said latch into an out of engagement with one of the parts, and separation effecting means for moving said latch and engaged part longitudinally with respect to the axis of rotation of said barrel.

5. An apparatus as set forth in claim 4 wherein said separation effecting means includes power lines extending through said barrel, and retractable means for taking up the slack in said power lines during the rotation of said barrel.

6. An apparatus as set forth in claim 4 wherein said separating means includes a cylinder in said housing, a piston rod extending out of said cylinder, said latch being secured to said piston rod, and said lock means for moving latch including a rotary actuator secured to said cylnder for rotating said cylinder and piston rod.

7. An apparatus as set forth in claim 6 including a bellows boot connected between said piston rod and said cylinder.

8. An apparatus as set forth in claim 4 wherein said separation effecting means includes a piston rod and cylinder assembly, said latch being secured to said assembly, said lock means including cam means for raising and lowering said latch in response to the extension and retraction of the piston rod from the cylinder of said assembly.

9. An apparatus as set forth in claim 8 wherein said separating means is disposed at one end of said barrel, secondary separating means being disposed at the other end of said barrel, said secondary separating means including a secondary piston-rod and cylinder assembly, a secondary latch secured to said secondary assembly, said secondary latch having a cam face and a locking shoulder, and switch means operable by said feed means for actuating both said separation effecting means and said secondary piston rod and cylinder means.

10. An apparatus as set forth in claim 8 wherein said feed means includes a ram for pushing the parts one at a time into said barrel, said separating effecting means including an extension on said ram for contacting said piston rod and cylinder assembly to push against said assembly simultaneously with the pushing action against the parts, and said lock means being cam means for moving said latch into and out of engagement with a part.

11. An apparatus as set forth in claim 10 wherein the cylinder of said assembly is secured to said barrel, a movable carriage being in said barrel, the piston rod of said assembly being secured to said carriage whereby said carriage moves within said barrel when said piston rod is moved by said extension, said latch being secured to said carriage, power means connected to said assembly for reversing the direction of movement of said piston rod when said ram extension is moved out of contact with said assembly, and said extension being adjustable to synchronize the contact of said extension against said assembly with the contact of said ram against the part.

12. An apparatus as set forth in claim 4 wherein said latch includes a workpiece engaging surface, said lock means including pivot means to permit parts to pass into and out of engagement with said latch, and said separation effecting means including pivot inactivating means actuated by said feed means for holding said latch in engagement with a part to prevent the part from moving forward while its adjacent part continues to move to create a gap therebetween.

13. An apparatus as set forth in claim 12 wherein said feed means includes a ram, said pivot means including a pivotal connection between said latch and said barrel, said pivot inactivating means including a rod connected to said latch, said rod being in the path of motion of said ram, and a spring loaded plunger on said ram for cushioning the contact of said ram against said rod.

References Cited
UNITED STATES PATENTS

| 2,204,636 | 6/1940 | Turnbull | 51—14 X |
| 2,565,341 | 8/1951 | Arispe | 51—15 |
| 3,387,410 | 6/1968 | Powell | 51—15 |

LESTER M. SWINGLE, Primary Examiner

PO-1050
(5/69)

UNITED STATES PATENT OFFICE
CERTIFICATE OF CORRECTION

Patent No. 3,534,504     Dated October 20, 1970

Inventor(s) James H. Carpenter, Jr.

It is certified that error appears in the above-identified patent and that said Letters Patent are hereby corrected as shown below:

Column 2, line 63 "is" should be --- in ---

Column 6, line 53, after "lock" --- means for --- should be inserted

Column 6, line 54, "an" should be --- and ---

Column 6, line 67, before "latch" --- said --- should be inserted

Column 7, line 16, "separating" should be --- separation ---

Signed and sealed this 6th day of April 1971.

(SEAL)
Attest:

EDWARD M. FLETCHER, JR.
Attesting Officer

WILLIAM E. SCHUYLER, JR.
Commissioner of Patents